Feb. 22, 1966  R. E. GALER ETAL  3,236,504
METHOD AND APPARATUS FOR BLENDING PULVERULENT MATERIAL
Filed May 13, 1964
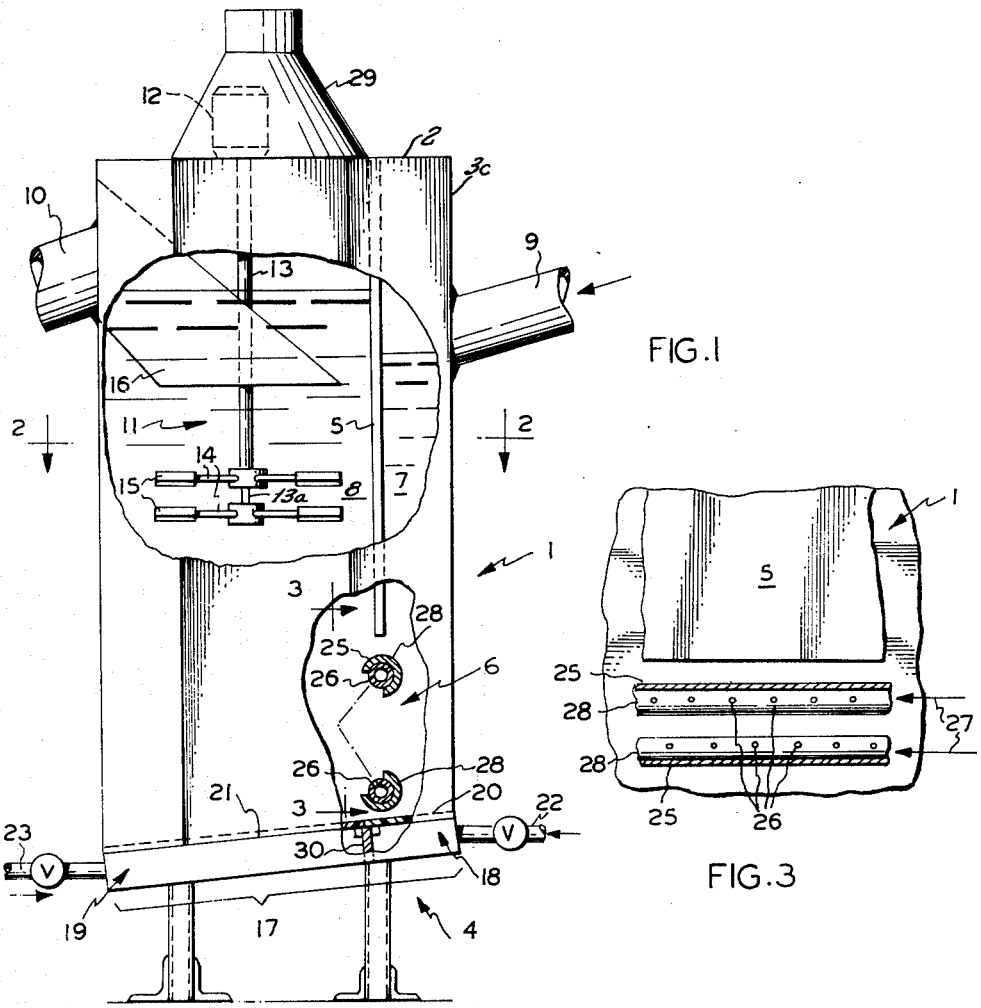
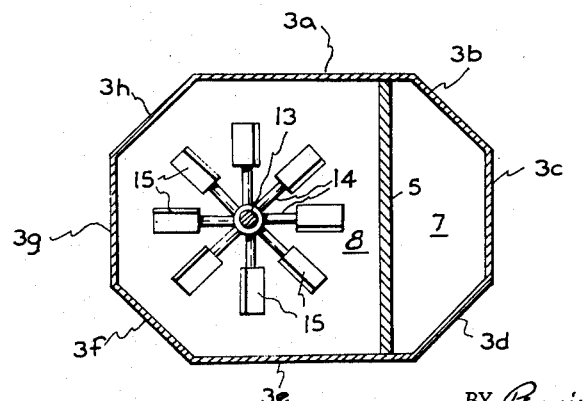
INVENTORS
RICHARD E. GALER
LYNN A. WALLACE
VICTOR G. NIEBUHR
PAUL W. REINECKE
BY Pennie, Edmonds, Morton, Taylor
and Adams
ATTORNEYS United States Patent Office 3,236,504
Patented Feb. 22, 1966

3,236,504
METHOD AND APPARATUS FOR BLENDING PULVERULENT MATERIAL
Richard E. Galer, Ossineke, and Lynn A. Wallace, Victor G. Niebuhr, and Paul W. Reinecke, Alpena, Mich., assignors to Huron Portland Cement Company, Detroit, Mich., a corporation of Michigan
Filed May 13, 1964, Ser. No. 367,049
22 Claims. (Cl. 259—147)

This present invention relates to a method and apparatus for the blending of pulverulent material. More specifically, this invention relates to the mixing of individual pulverized feed components required for the manufacture of cement.

In the manufacture of Portland cement, it usually is necessary to mix a variety of feed components prior to their introduction into a kiln for final production into finished cement.

The various raw materials to be mixed together provide the required amounts of calcium, aluminum, iron and silica for the finished product. Among the raw materials used are included limestone, shale, sand and iron ore, or any combinations of natural or artificial minerals, such as by-products from other processes.

It is essential, from the standpoint of product quality control and optimum performance of processing equipment, that the chemical compositions of the feed introduced into the kiln be maintained consistently at specified chemical compositions. Cement kiln burning processes are delicate or tricky and can easily be upset, thus adding to operating and maintenance costs. The lesser the adjustments required in the kiln burning process, the easier it is to properly burn the raw material to a uniform quality.

In order to approach these requirements, it is necessary to analyze the mixed stream of raw materials feed components frequently for the oxides of calcium, aluminum, iron, silica, magnesium and sulfur and to re-adjust the amounts of the appropriate feed components as quickly as possible to minimize deviation from the desired chemical composition.

Attempts have been made in the past to blend pulverulent materials before passing them into the kiln. However, such attempts have not proved entirely satisfactory for all purposes, since the prior blenders have involved very large structures which have failed to accomplish fast blending, often requiring a blending period measured in hours. Further, since the prior blenders have been designed to mix large volumes of materials, it has been found that they do not operate as economically when handling small volumes of component feed materials.

This invention relates to a method and apparatus for obtaining short residence-time mixing of multiple components, such as those required for cement kiln feed.

In general, the preferred form of apparatus of the present invention comprises a bin for blending fluidizable pulverulent material. The bin is divided into at least two compartments, each of which is provided with underlying aerations means. Means are provided for supplying material to be blended into a first compartment, transferring it to a second compartment, and finally discharging it for further use. A gas is supplied to the aeration means of the first compartment to permit slight aeration of the material therein, while further gas is delivered to the aeration means of the second compartment at a higher rate than to that of the first compartment. An impeller is positioned within the bin to extend within the second compartment to agitate and to provide a positive mixing force for said material.

Preferably, a discharge conduit in the nature of a shroud, communicating with and extending within the bin, is located so that its one end is positioned directly above the impeller means to provide a directed material overflow for the selective removal of the blended material.

This invention also contemplates the use of a particular means for transferring and mixing the pulverulent materials as they pass from a first to a second compartment, and includes an aperture pump which angularly directs a stream of diverging air into the second compartment to aid in the transfer and mixing of the pulverulent materials.

A better understanding of the invention may be derived from the following description and accompanying drawings, in which:

FIG. 1 is an elevation, partly in section, of the invention;

FIG. 2 is a top view of the invention, taken along line 2—2;

FIG. 3 is a partial sectional view of the invention taken along line 3—3 of FIG. 1.

The invention, as shown in FIG. 1, embodies a bin, generally indicated by 1, having a top wall 2, several side walls 3a–3h and a floor 4. Although the bin is shown as a flattened octagon, in cross-section, it is to be understood that other shapes may be used, if desired.

A baffle 5 is suspended vertically from the top side 2 of the bin 1, and is slidably attached to two opposite sides 3a and 3e of the bin 1. The baffle 5 does not extend completely through the bin 1 to the floor 4, but is held in a spaced relationship away from the floor 4 to define a transfer aperture 6. The baffle 5 thus divides a bin 1 into a first compartment 7, defined by the area within the bin 1 to the right of the baffle 5, and a second compartment 8, defined by the area within the bin 1 to the left of the baffle 5. The first compartment 7 is provided with a material inlet 9, while the second compartment 8 is provided with a material outlet 10. The material outlet 10 is positioned at a point higher than the material inlet 9, but the material levels adjacent the inlet and outlet may be modified, as discussed hereinafter.

Extending downwardly within the second compartment 8 is a mixer, generally indicated by numeral 11, comprising a motor 12 mounted on the top wall 2 and impeller drive shafts 13 and 13a extending vertically downwardly from the motor 12 to a point lower than the material outlet 10. Attached to the lower ends of the drive shafts 13 and 13a, but spaced from each other, are two rows of horizontally outwardly-extending members 14, each having an adjustable impeller blade 15 attached. Each row of outwardly-extending members 14 is so positioned on one of the drive shafts 13 and 13a so that each row rotates in the opposite direction on its drive shaft.

Positioned immediately above the impeller blades is a shroud 16 communicating with the material outlet 10 for routing the blended materials from a specific zone or selected zone within the bin 1 to the material outlet 10. This shroud is so positioned within the second compartment 8 of the bin 1 so that it extracts only a selected portion of the material immediately after it has been thoroughly mixed by the impeller blades.

The floor 4 of the bin 1 contains a gas permeable deck 17. This deck 17 comprises two plenum chambers 18 and 19 spaced apart from one another and divided by a partition 30. Each plenum chamber 18 and 19 has a gas permeable deck 20 and 21, respectively, underlying the compartments 7 and 8. Plenum chamber 18 is supplied with air through air inlet 22, while plenum chamber 19 is in communication with air inlet 23. To provide a more efficient transfer of material from the first compartment 7 to the second compartment 8, it has been found desirable to angle the gas permeable deck 17 downwardly in the direction of the second compartment 8.

Positioned across the aperture 6 are two horizontal, parallel pipes 25. These pipes are arranged one above the other. One pipe 25 is situated at a point immediately below the baffle 5, while the other is arranged immediately above the gas permeable deck 17. Each pipe 25 is perforated with holes or perforations 26 which extend through to its interior. The perforations 26 are arranged in a line lengthwise of the pipes 25. Air is supplied to each perforated pipe 25 by means of air supply 27.

Each pipe 25 is enclosed by an outside pipe 28. The outside pipes 28 have a 90 degree pipe segment cut out along their entire length. The perofrated pipes 25 are adapted to be rotated within the outside pipes 28.

In a preferred embodiment, the perforated pipes 25 are ¾" in diameter, while the outside pipes are 1" in diameter. The perforations 26 in the pipes 25 are arranged along each pipe, as mentioned above, and are spaced 1½" apart.

The top wall 2 carries an air vent 29 which vents away the air rising through the bin 1 from the gas permeable deck 17.

In the operation of the invention illustrated in FIGS 1 and 2, a stream of material, including the various feed components, is introduced into the first compartment 7 via the material inlet 9. The incoming material drops by gravity into the first compartment 7 of the bin 1. Air is forced from air inlet 18 through first section 20 of the gas permeable deck 17, and up into the material in first compartment 7. The amount of air passing into the first compartment 7 is regulated so that the incoming material is slightly aerated to bake it mobile enough to flow downwardly to the aperture 6, and to be transferred into the second compartment 8.

Air is further forced from air inlet 23 through the second section 21 of the gas permeable deck 17 and passes up into the material in the second compartment 8. However, the amount of air passing through this second compartment 8 is adjusted to cause a higher degree of aeration than occurring in the first compartment. The rate of flow of air into the second compartment is to be sufficient to cause an agitation and mixing of the material in that compartment.

Compressed air is supplied to the air inlet 27 of the perforated pipes 25 and is ejected into the bin through the perforations 26 arranged in the pipe. The perforated pipes 25 and the outside pipes 28 are so arranged that a diverging stream of air from the perforated pipes is directed into the second compartment 8. It has been found that the optimum mixing of the material, as said material passes through the aperture, is accomplished when the air streams converge at an included angle equaling approximately 120 degrees. It has also been discovered that the material may be transferred from the first to the second compartment at an optimum rate when this included angle was adjusted to approximately 90 degrees. Accordingly, depending upon the desired speed of transfer of material from one compartment to another, or upon the degree of mixing required, the perforated pipes may be rotated so that the included angle is of a value between 90 and 120 degrees.

Once the feed material is transferred into the second compartment 8 and reaches the impeller depth, the impeller motor is activated and the impeller blades 15 are caused to rotate. The upper row of blades 15 may rotate clockwise while the lower blades 15 may revolve in a counter-clockwise direction, or vice versa, depending upon the gearing relationship of the impeller shafts 13 and 13a.

The feed material elevated into the second compartment by the action of the upwardly flowing air, contacts and passes through the shearing action of the rotating blades.

Immediately upon passing through the impeller blades 15 the feed material, now completely blended, rises into the shroud 16 until it overflows the bin and passes out the material outlet 10, where it can be continuously sampled and analyzed.

Since there is a differential aeration in each compartment of the bin 1, the material level of the blended components in the second compartment 8 of the bin 1 is higher than that level of the incoming material in the first compartment 7. The baffle 5 may be adjusted vertically within the bin to vary the rate of transfer of the pulverulent materials between the compartments, and accordingly, adjust the rate of blended material overflowing into the material outlet 10.

By placing the impeller blades at a slight angle, a lifting force can be effected upon the material in the second compartment 8 which, when combined with the high degree of aeration in the second compartment, permits discharge of the blended material from the bin 1 at a greater rate and to a higher discharge elevation.

In order to prevent the pulverulent solid materials from entering the perforations 26 in the pipe 25, when the air inlet 27 is shut off, the perforated pipe 25 is rotated so that the perforations 26 are sealed by the interior of the outer pipe 28.

Various changes may be made in the method of operation and the apparatus described herein without departing from the spirit of the invention, or sacrificing any of the advantages thereof.

We claim:

1. An apparatus for blending pulverulent materials, comprising: (a) a bin having a floor; (b) a vertical baffle extending within the bin to separate said bin into two compartments, said baffle being positioned in a spaced relationship with said floor of said bin to define an aperture therebetween; (c) an inlet located adjacent the top of said bin for supplying materials into a first compartment of said bin; (d) a means for supplying gas to said first compartment for slight aeration of materials therein; (e) a means for transferring said materials to a second compartment of said bin; (f) a means for emitting gas into said second compartment for blending said materials therein; (g) an impeller means comprising a motor, an impeller shaft extending through the bin and into said second compartment and a plurality of rotating impeller blades attached to said shaft adapted to agitate and to provide a positive mixing force for said materials; and (h) an outlet communicating with said second compartment for discharging said materials after being blended.

2. The apparatus of claim 1, wherein the floor comprises a gas permeable deck sloping in a downward direction from beneath said supply inlet to a position beneath said discharge outlet.

3. The apparatus of claim 2, wherein the said discharge outlet is adapted to receive the overflow of said materials rising in said second compartment.

4. The apparatus of claim 3, including a shroud located within said second compartment having one end communicating with said discharge outlet and the other positioned immediately above said impeller blades.

5. The apparatus of claim 4, wherein said plurality of impeller blades are arranged in two rows about the impeller shaft with each row rotating in a direction opposite to the other.

6. The apparatus of claim 5, wherein the impeller blades are angled slightly to provide a lifting force to said materials.

7. A method for blending pulverulent materials in a two-compartment mixing bin, comprising: (a) introducing materials to be blended downwardly into a first compartment of said bin; (b) subjecting the materials in said first compartment to an upward dissemination of gas to slightly aerate said materials and thus control their downward flow; (c) passing said materials from the first compartment into a second compartment of said bin; (d)

subjecting the materials in the second compartment to an upward dissemination of gas to highly aerate the materials therein; (e) mechanically agitating said materials within said second compartment to fully blend said materials, and (f) discharging the blended materials from the second compartment of said bin.

8. A method for blending pulverulent materials in a two-compartment mixing bin, comprising: (a) introducing materials to be blended into a first compartment of said bin; (b) subjecting the materials in said first compartment to an upward dissemination of gas to slightly aerate said materials and thus control the downward flow; (c) passing said materials from the first compartment into a second compartment of said bin; (d) subjecting the materials in the second compartment to an upward dissemination of gas to highly aerate the materials therein; (e) mechanically agitating said materials within said second compartment to fully blend said materials; and (f) allowing the blended materials to overflow and be discharged from the second compartment of said bin.

9. A method for blending pulverulent materials in a two-compartment mixing bin, comprising: (a) introducing materials to be blended downwardly into a first compartment of said bin; (b) subjecting the materials in said first compartment to an upward dissemination of gas to slightly aerate said materials and thus control the downward flow; (c) passing said materials from the first compartment into a second compartment of said bin; (d) subjecting the materials in the second compartment to an upward dissemination of gas to highly aerate the materials therein; (e) mechanically agitating said materials within said second compartment to fully blend said materials; and (f) discharging the blended materials from the second compartment of said bin immediately after they have been subjected to the mechanical agitation.

10. A method for blending pulverulent materials in a two-compartment mixing bin, comprising: (a) introducing materials to be blended downwardly into a first compartment of said bin; (b) subjecting the materials in said first compartment to an upward dissemination of gas to slightly aerate said materials and thus control the downward flow; (c) passing said materials from the first compartment into a second compartment of said bin; (d) subjecting the materials in the second compartment to an upward dissemination of gas to highly aerate the materials therein; (e) mechanically agitating said materials within said second compartment to fully blend said materials; and (f) allowing the blended materials to overflow and be discharged from the second compartment of said bin immediately after they have been subjected to the mechanical agitation.

11. An apparatus for blending and transferring pulverulent materials comprising: (a) a bin having at least two compartments; (b) an inlet for supplying said materials to a first compartment of said bin; (c) a means for supplying gas to said first compartment to aerate said materials therein; (d) an aperture positioned to transfer said materials to a second compartment in said bin; (e) means within the aperture for angularly directing a stream of diverging gas into said second compartment to sweep said materials into said second compartment; and (f) a means for emitting gas into said second compartment of said bin to aerate said materials.

12. An apparatus for blending and transferring pulverulent materials comprising: (a) a bin having at least two compartments; (b) an inlet for supplying said materials to a first compartment of said bin; (c) a means for supplying gas to said first compartment to aerate said materials therein; (d) an aperture positioned to transfer said materials to a second compartment in said bin; (e) an aperture pump comprising two horizontally-extending pipes positioned in parallel arrangement across said aperture, said pipes being disposed one above the other and having a series of perforations therein in line lengthwise of the pipes; (f) means for rotating said pipes; (g) means for introducing a gas in said pipes; and (h) means for emitting gas into said second compartment to aerate said materials therein.

13. The apparatus of claim 12, including a means for sealing said perforations.

14. The apparatus of claim 13, wherein said sealing means includes an outside pipe enclosing each said perforated pipe, having a pipe segment cut out along its entire length.

15. An apparatus for blending pulverulent material, comprising: (a) a bin having at least two compartments; (b) an inlet for supplying said materials to be blended to a first compartment in said bin; (c) a means for supplying gas to said first compartment to permit slight aeration of the material therein; (d) a means adapted to transfer said materials to a second compartment in said bin; (e) a means for emitting gas into said second compartment of said bin at a higher rate of flow than into said first compartment for blending said material therein; (f) an impeller means extending within said second compartment adapted to agitate and to provide a positive mixing force for said material; (g) an outlet for discharging from the second compartment said materials after they have been blended; and (h) a shroud located within said second section having one end communicating with said discharge outlet and the other positioned adjacent said impeller means.

16. The apparatus of claim 15, wherein said transfer means includes an aperture communicating with both said compartments and a means within said aperture for angularly directing a stream of diverging gas into said second compartment to sweep said materials into said second compartment.

17. The apparatus of claim 1, including an aperture pump comprising two horizontally-extending pipes positioned in parallel arrangement across said aperture, said pipes being disposed one above the other and having a series of perforations therein in line lengthwise of the pipes, means for rotating said pipes, and means for introducing a gas into said pipes.

18. The apparatus of claim 17, including a means for sealing said perforations.

19. The apparatus of claim 18, wherein said sealing means includes an outside pipe enclosing each said perforated pipe, having a pipe segment cut out along its entire length.

20. A method for blending pulverulent materials in a two-compartment mixing bin, comprising: (a) introducing materials to be blended downwardly into a first compartment of said bin; (b) subjecting the materials in said first compartment to an upward dissemination of gas to slightly aerate said materials and thus control the downward flow; (c) passing said materials from the first compartment into a second compartment of said bin and simultaneously disposing the materials to the action of an angular, divergent stream of gas; (d) subjecting the materials in the second compartment to an upward dissemination of gas to highly aerate the materials therein; (e) mechanically agitating said materials within said second compartment to fully blend said materials; and (f) allowing the blended materials to overflow and be discharged from the second compartment of said bin.

21. A method for blending pulverulent materials in a two-compartment mixing bin, comprising: (a) introducing materials to be blended downwardly into a first compartment of said bin; (b) subjecting the materials in said first compartment to an upward dissemination of gas to slightly aerate said materials and thus impede the downward flow; (c) passing said materials from the first compartment into a second compartment of said bin and simultaneously disposing the materials to the action of an angular, divergent stream of gas; (d) subjecting the materials in the second compartment to an upward dissemination of gas to highly aerate the materials therein; (e) mechanically agitating said materials within said second compartment to fully blend said materials; and (f) discharging the blended materials from the second compartment of said bin immediately after they have been subjected to the mechanical agitation.

22. A method for blending pulverulent materials in a two- compartment mixing bin, comprising: (a) introducing materials to be blended downwardly into a first compartment of said bin; (b) subjecting the materials in said first compartment to an upward dissemination of gas to slightly aerate said materials and thus control the downward flow; (c) passing said materials from the first compartment into a second compartment of said bin and simultaneously disposing the materials to the action of an angular, divergent stream of gas; (d) subjecting the materials in the second compartment to an upward dissemination of gas to highly aerate the materials therein; (e) mechanically agitating said materials within said second compartment to fully blend said materials; and (f) allowing the blended materials to overflow and be discharged from the second compartment of said bin immediately after they have been subjected to the mechanical agitation.

References Cited by the Examiner
UNITED STATES PATENTS
1,660,402 2/1928 Thomson _____ 259—147

WALTER A SCHEEL, Primary Examiner.

CHARLES A. WILLMUTH, Examiner.